United States Patent
Fu et al.

(10) Patent No.: US 10,924,744 B2
(45) Date of Patent: Feb. 16, 2021

(54) SELECTIVE CODING

(71) Applicant: INTEL CORPORATION, Santa Clara, CA (US)

(72) Inventors: Fangwen Fu, Folsom, CA (US); Jason Tanner, Folsom, CA (US); Satya N. Yedidi, Roseville, CA (US)

(73) Assignee: INTEL CORPORATION, Santa Clara, CA (US)

(*) Notice: Subject to any disclaimer, the term of this patent is extended or adjusted under 35 U.S.C. 154(b) by 406 days.

(21) Appl. No.: 15/815,759

(22) Filed: Nov. 17, 2017

(65) Prior Publication Data
US 2019/0028710 A1    Jan. 24, 2019

(51) Int. Cl.
| | |
|---|---|
| *H04N 19/146* | (2014.01) |
| *H04N 19/51* | (2014.01) |
| *G06F 9/451* | (2018.01) |
| *H04N 19/105* | (2014.01) |
| *H04N 19/172* | (2014.01) |
| *H04N 19/107* | (2014.01) |
| *G06F 8/38* | (2018.01) |
| *H04N 19/192* | (2014.01) |
| *H04N 19/567* | (2014.01) |

(52) U.S. Cl.
CPC ............ *H04N 19/146* (2014.11); *G06F 8/38* (2013.01); *G06F 9/452* (2018.02); *H04N 19/105* (2014.11); *H04N 19/107* (2014.11); *H04N 19/172* (2014.11); *H04N 19/192* (2014.11); *H04N 19/51* (2014.11); *H04N 19/567* (2014.11)

(58) Field of Classification Search
CPC ............................... H04N 19/146; G06F 8/38
See application file for complete search history.

(56) References Cited

U.S. PATENT DOCUMENTS

| | | | | |
|---|---|---|---|---|
| 2003/0156644 | A1* | 8/2003 | Song | H04N 19/112 375/240.13 |
| 2006/0165169 | A1* | 7/2006 | Ng | H04N 19/17 375/240.12 |
| 2008/0165851 | A1* | 7/2008 | Shi | H04N 19/139 375/240.16 |
| 2010/0080292 | A1* | 4/2010 | Coulombe | H04N 19/152 375/240.12 |
| 2012/0201476 | A1* | 8/2012 | Carmel | H04N 19/60 382/239 |
| 2014/0270537 | A1* | 9/2014 | Lo | G06T 15/20 382/195 |
| 2015/0195506 | A1* | 7/2015 | Lin | H04N 19/70 375/240.16 |

(Continued)

*Primary Examiner* — William C Vaughn, Jr.
*Assistant Examiner* — Jerry T Jean Baptiste
(74) *Attorney, Agent, or Firm* — Hanley, Flight & Zimmerman, LLC

(57) ABSTRACT

The present techniques include deriving a threshold to maintain an encoding bitrate and determining a percentage of change of a current frame N based on an impact to a bitrate budget. The present techniques also include marking a reference frame N−1 as non-referenceable in response to the percentage of change being smaller than the threshold and encoding a static portion of frame N as a skip and encoding a non-static portion of frame N by referencing the reference frame N−1. Finally, the present techniques include overwriting a surface of the reference frame N with portions of the reference frame N−1 that have changed as compared to frame N.

25 Claims, 5 Drawing Sheets

(56) References Cited

U.S. PATENT DOCUMENTS

| | | | |
|---|---|---|---|
| 2016/0134865 A1* | 5/2016 | Amer | H04N 19/176 375/240.02 |
| 2019/0289296 A1* | 9/2019 | Kottke | H04N 19/115 |

* cited by examiner

400

SELECTIVE CODING

BACKGROUND ART

Wireless displays are often used to render images and video content. For example, a tablet device may send all images and video on its desktop to a television to be rendered. Often, the video content may include a portion of the display being static, while other portions of the display are active. When a subsection of a frame has changed, with another portion of being static, the changed portion may be referred to dirty rectangles. The bandwidth associated with data transmission may be reduced by leveraging the dirty rectangles.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
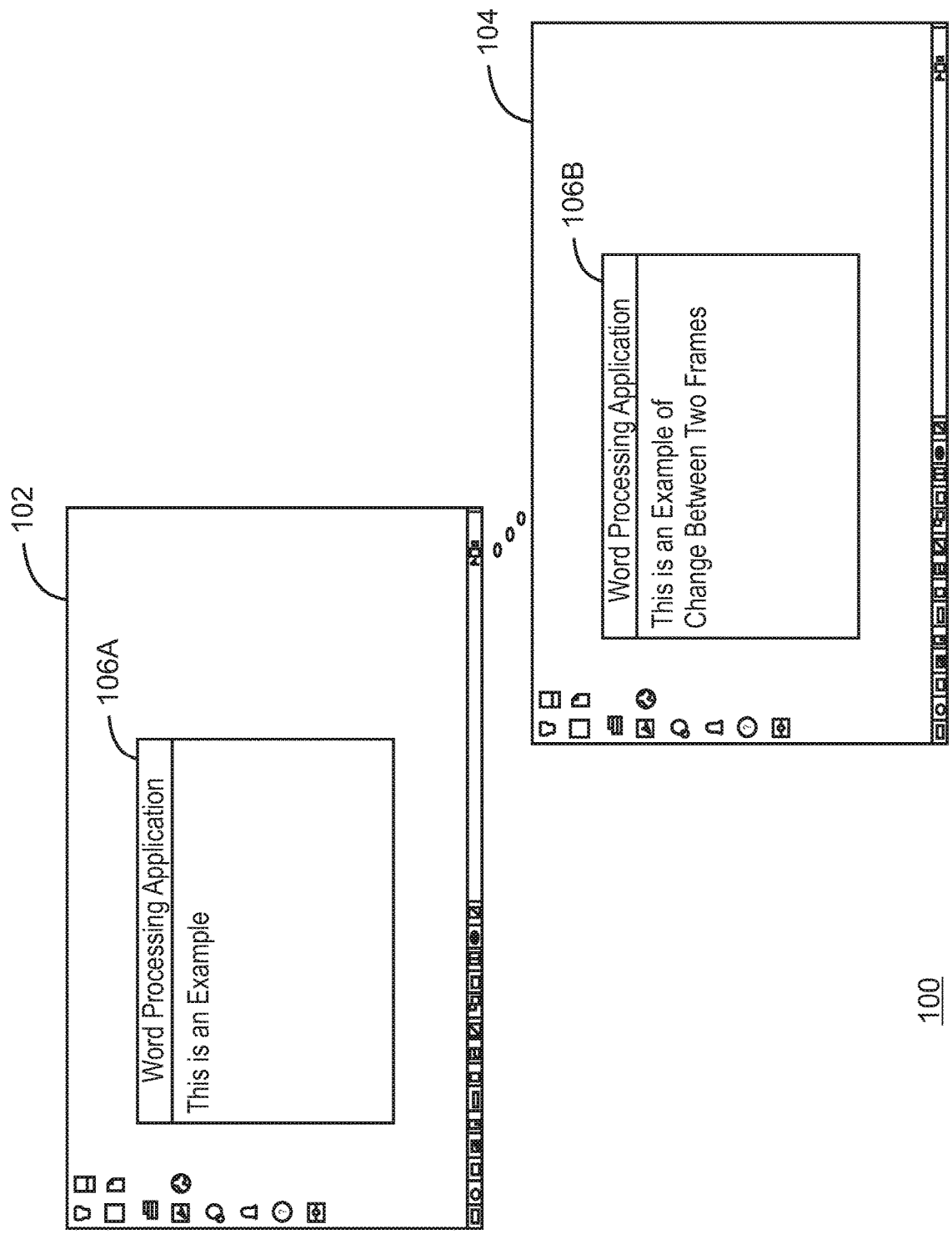
FIG. 1 is an illustration of two frames.

Wireless displays often render a portion of a frame that is static, while another portion of the frame is dynamic with actively changing video content. The use of wireless displays may consume a relatively large amount of power, as the entire frame is typically encoded, decoded, and processed. Thus, the entire frame is read, processed, and written during the encode and decode processes.

Wireless Display (WiDi) may refer to a technique by which a desktop of an electronic device is rendered on a remote display, wirelessly. For example, a tablet device may send all images on its desktop to a television to be rendered. Typical uses for WiDi may include video playback, video conferencing, video chat, word processing, web browsing, and the like. Each of these uses involve a portion of the display that is static, while another portion of the display may be dedicated to displaying active content over the wireless channel. The use of WiDi may consume a relatively large amount of power, as entire frames from the desktop are rendered which may require a wireless transmission bandwidth of at least three times the frame size, depending on the compression scheme used to code the frames.

Embodiments described herein enable selective coding. The present techniques include deriving a threshold to maintain an encoding bitrate and determining a percentage of change of a current frame N based on an impact to a bitrate budget. The present techniques also include marking a reference frame N−1 as non-referenceable in response to the percentage of change being smaller than the threshold, encoding a static portion of frame N as a skip, and encoding a non-static portion of frame N by referencing the reference frame N−1. Finally, the present techniques include overwriting a surface of the reference frame N with portions of the reference frame N−1 that have changed as compared to frame N.

In embodiments, the present techniques remove the need to write out an entire reconstructed reference picture. For example, assume 95% of a frame is static from one frame to the next. The current frame N typically references the prior frame N−1 in a reference list. The present techniques maintain that referencing, but as frame N is encoded and references frame N−1, frame N−1 is marked as invalid for future referencing. While frame N reads only the subsections that have changed from N−1, it will encode and overwrite only those changed sections to the reference frame. Thus, if 95% of the frame is static, only 5% of the frame will be read and written saving 95% of the reads and writes. The result is much faster performance since the number of processing blocks is proportional to the percentage of blocks that change. In some cases, this is approximately twenty times faster for a 5% change compared to processing the full frame.

Various video standards may be used according to the present techniques. Exemplary standards include the H.264/MPEG-4 Advanced Video Coding (AVC) standard developed by the ITU-T Video Coding Experts Group (VCEG) with the ISO/IEC JTC1 Moving Picture Experts Group (MPEG), first completed in May 2003 with several revisions and extensions added to date. Another exemplary standard is the High Efficiency Video Coding (HEVC) standard developed by the same organizations with the second version completed and approved in 2014 and published in early 2015. A third exemplary standard is the VP9 standard, initially released on Dec. 13, 2012 by Google.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment,"

"one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Video encoding is done to compress a signal to a much smaller size for transmission. The transmission may occur over a wired connection, such as an Ethernet connection. The transmission may also occur over wireless connection, such as according to wireless fidelity (WiFi) protocols. Compression can be done as via either spatial compression or temporal compression. Spatial compression can be used to compress each frame independent of other frames, also known as intra-frame coding. By contrast, temporal compression may be used to compress video frames based on information in other frames. For example, the other frames may be referenced in a group of pictures (GOP).

Most spatial compression schemes can achieve compression ratios such as four uncompressed frames to one compressed frame (4:1) or eight uncompressed frames to one compressed frame (8:1). Temporal compression can be used to achieve much higher compression ratios, such as one hundred compressed frames to one compressed frame (100:1). With temporal compression, the current frame is encoded by finding similar content on a prior frame. In particular, the difference in spatial location between identical content on the two frames will be a new motion vector. The motion vector indicates to a decoder the block of pixels to sample from the prior frame as an initial reference. The residual between the corresponding blocks of pixels is transformed, quantized, and coefficients are transmitted to the decoder to compensate for the prediction error. This temporal prediction enables much better compression than spatial only compression.

One of the downsides to the temporal compression is that it requires more system memory bandwidth than a spatial only schema. In temporal compression, the current frame source pixels are fetched, then a search of the source pixels against a prior reconstructed reference picture is performed. When searching for corresponding pixels in the reconstructed reference picture, the reconstructed reference picture is oversampled, although often available in a cache. The block coding decisions are made according to the corresponding reconstructed pixels. Block decisions include, but are not limited to, a block type such as an intra-coded block, predictive coded block, or bidirectionally predicted block. Block decisions may also include selection of coding tree of shapes, transform size, motion vector for inter-coded blocks, prediction mode for intra-coded blocks, and the like. The pixels are written out to be a future reference picture in reconstructed form. Without memory compression, the bandwidth required for this temporal compression is at a minimum three times the picture frame size. Even with spatial compression only, with no reconstructed reference reads, the bandwidth is at a minimum two times the source picture frame size, which covers the source reads and reconstructed writes.

FIG. 1 is an illustration of two frames 102 and 104. The frames 102 and 104 may be a within a group of pictures (GOPs). For ease of description, each of frames 102 and 104 are illustrated as including an entire desktop. However, the frames may be limited to any portion of the desktop. For example, a frame may include only the word processing application 106A or 106B. Moreover, frame 102 and frame 104 need not be consecutive frames. Rather, frame 102 is captured at an earlier point in time when compared to frame 104.

In the present example, the word processing application 106A belongs to frame 102, and the word processing application 106B belongs to frame 104. The word processing application 106A includes the typed text "This is an example." The word processing application 106B includes the typed text "This is an example of change between two frames." The change in the text of frame 102 and frame 104 is an example, as typical frame rates may not enable as much additional text as illustrated between frames 102 and 104.

Traditional compression techniques such as changed regions may divide the frame into several regions that are obtained from the desktop at various intervals. A region may be a changed region when one or more pixels within the region have changed when compared with a previous region that corresponds to the current region. When the region is a rectangle, and the rectangle contains any changed pixels, it may be referred to as a dirty rectangle. A common situation for various applications is that only a portion or subsection of the frame is changing, resulting in multiple static regions and multiple dirty rectangles. In embodiments, the image information of the changed regions form a video surface. As used herein, the video surface is a dynamic portion of the display that is used to render a video or other media on the desktop. The static portion of the display may be referred to as a background surface.

The operating system (OS) is typically aware of the different planes that create the final surface to be rendered. In some cases, the OS has additional information regarding the small part of that surface that changed according to other bandwidth saving features such as dirty rectangles, skip tiles, skip frames, memory compression and the like. The skip tiles may be an encoder feature used when dirty rectangles are implemented during encoding. Additionally, an interface exists where the OS can communicate which parts of the screen have changed, such as the dirty rectangles. In each case, the prior reference frame is read if using a skip or inter-predicted blocks to copy to the new reconstructed surface, or the source is read to encode the intra-predicted blocks. Each read requires a system memory bandwidth of at least two times the uncompressed frame size. Skips are often used when a frame or tile is coded without the use of motion vectors. In such a case, a decoder will derive the motion vector of the skip mode coded frame or tile from other frames or tiles already decoded. The corresponding parts, such as motion vectors or movement predictions, are required to be reconstructed for the next frame after the skipped frame, as a reference. Some codecs may also provide multiple reference candidates, where one candidate is a zero motion vector (ZMV). In this scenario, the zero motion vector is also coded.

The number of reference frames used for encoding may be based on the encoder/decoder specifications. The plurality of reference frames enables an encoder to select more than one reference frame on which to base macroblock encoding of a current frame. Additionally, during encoding, each video frame may be divided into a number of macroblocks or coding units to be encoded. Often, the macroblock or coding unit is further divided into partitions of various sizes throughout the frame based on the image content. In embodiments, different reference frames can be selected for encoding different macroblocks in the same frame. The most common reference frame is the last frame encoded (the frame that is temporally adjacent). However, some frames are stored for long term reference. If referenceable frames are not specified, then all frames would be stored which would consume a large portion of memory bandwidth.

Bandwidth saving features such as dirty rectangles leverage a scenario where it is common for a small part of the frame buffer to change frame to frame. For instance, when a user is typing within a word processing application, on a web page, and the like, frames may change every 3 to 5 frames based on typing speed. This is illustrated by frames 102 and 104 of FIG. 1. The change created between these frames is small. In particular, this small change may affect one largest coding unit (LCU) to a number of LCU's, depending on block boundaries and font sizes. With traditional coding techniques, even typing a period (.) can require reading an entire reference frame as well as writing out a new reconstructed reference frame for this small change. Other changes that can be considered small yet require reading an entire reference frame and writing a new constructed reference frame are updates to the block, blinking cursors, blinking taskbars, small animations on webpages and programs, small video windows on some webpages, mouse movement, and the like. This description of small changes is for exemplary purposes only, and should not be considered limiting.

The present techniques are used to reduce the power and bandwidth required for frames with small changes. When there is a change, a threshold is defined for how small of a change is needed to begin a selective/partial frame write mode as described herein. This threshold depends on the frame resolution, quality of the prior reconstructed reference frame, current target bitrate/frame bitrate budget, content type, type of change (letter typed, mouse moved, etc.), and any combination thereof. If the percentage of pixels changed in the current frame is greater than this threshold, then the frame is encoded without selective encoding. In embodiments, the present techniques may target the compression of computer generated video contents such as Wireless Display (WiDi), especially WiDi in conjunction with productivity and/or augmented reality (AR) solutions.

Figure 2:
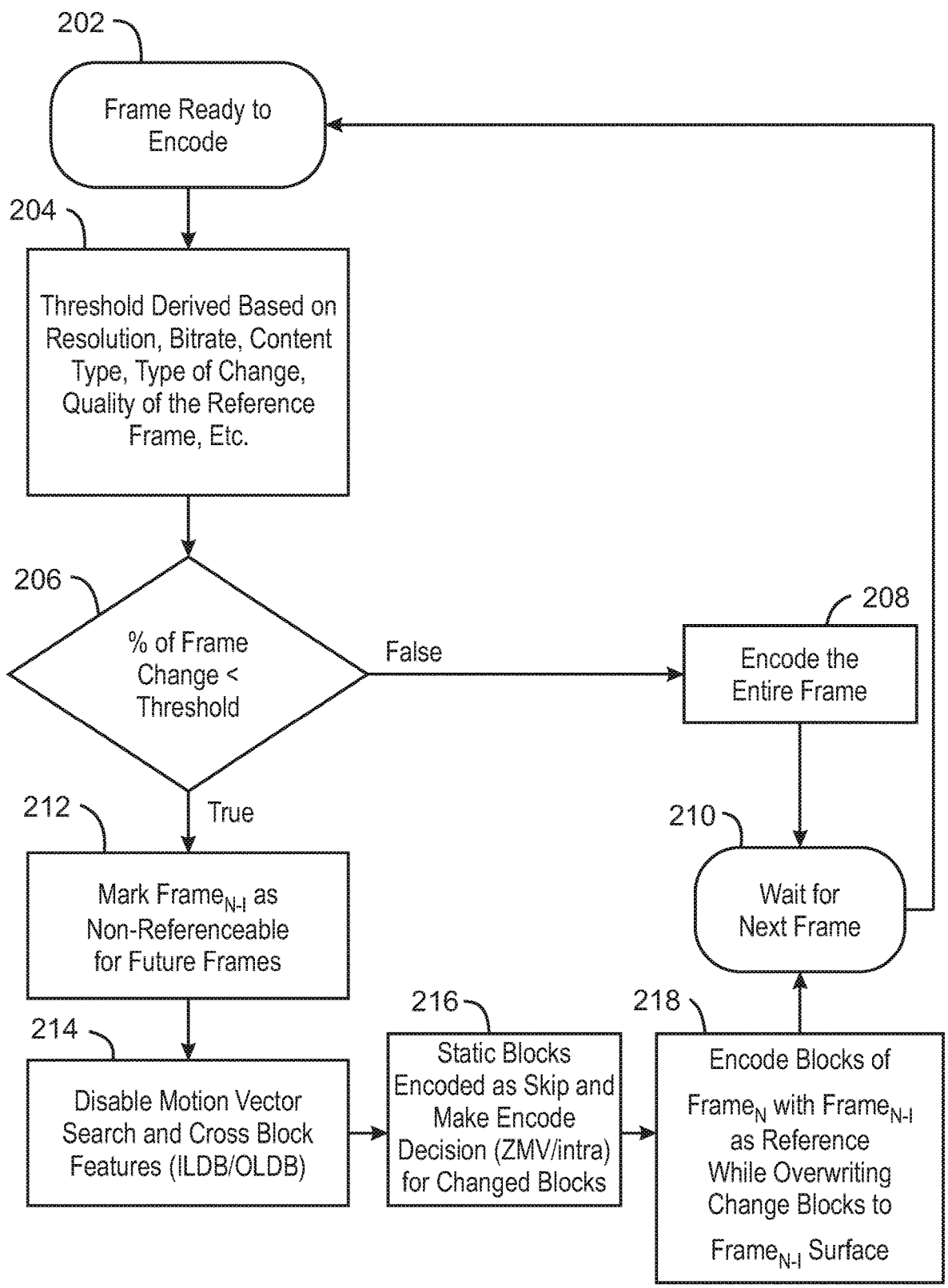
FIG. 2 is a process flow diagram of a method for selective encoding.

FIG. 2 is a process flow diagram of a method 200 for selective encoding. At block 200, a frame is ready for encoding. At block 204, a threshold is derived based on a number of factors. For example, the factors may include resolution, bitrate, content type, type of change, quality of the reference frame, and the like. In embodiments, the factors used to determine the threshold are analyzed based on their effect on the encoding bitrate. Thus, each factor has some relation to the bitrate used for encoding. A factor as used herein may be a coding parameter that has an impact on an encoding bitrate. For example, when encoding at a particular bitrate, the resolution may not change dynamically. However, the larger the resolution of the current frame, the higher the bitrate used to encode the frame. Thus, resolution may have a directly proportional impact on the encoding bitrate. Additionally, content type may also impact the bitrate. For example, the more complicated and changing the content is, the higher the bitrate used to encode the content. Complicated content may be, for example, a video playback, web browsing with active scrolling, and the like. As used herein, complicated, changing content may be content that changes at a rate to appear as natural video movement to a user. In examples, if the complicated content has a small change, it may use a greater number of bits for the small change as a result of the complicated content when compared to simpler, slower changing content. Complicated content may also be content that is changing at a rate that is faster than simpler content. The use of selective coding when coding the complicated content can reduce the bandwidth and power consumption by only encoding the changed portion of the frame, based on the derived threshold.

In the case of simpler content, such as a word processing document, where 40% of the frame has changed, the change may still be below a threshold due to the encoding bitrate used as the content type is not complex and does not make a large impact on the bitrate. Simpler content may be, for example, content that changes once every second or half second. In some cases, simpler content is content that changes at a frame rate that results in perceptible pauses between each change. Thus, a user can visually discern when the display is changing and when the display is static. Simpler content may also be content that is changing at a rate that is slower than complicated content.

The type of change may also affect the bitrate. In the case of streaming video via a web browser, this sort of change in a frame is different when compared to word processing. Moving a window on the desktop is also a different type of change when compared to streaming video or word processing. These various factors can be analyzed for their effect on the encoding bitrate. The interactive factors can be detected and used to determine a bitrate impact for the various types of changes occurring within the frames. In embodiments, the features may be interactive in that they may be subject to change based on a user action. Further, the quality of the prior reference frame can be used to determine the threshold as it relates to the bitrate.

As an example, consider a bitrate budget that allocates a number of bits per frame for transmission of the frame over a medium such as WiFi. The number of bits per frame can be determined by dividing a target bitrate of the encoded video by the frame rate. The factors may be analyzed on a per frame basis, and used to derive a threshold estimate of a percentage of the frame that can change and be partially encoded without degrading the video signal quality. This threshold depends on the frame resolution, quality of the prior reconstructed reference frame, current target bitrate/frame bitrate budget, content type, type of change (letter typed, mouse moved), and the like. Signal quality may be degraded when the selective coding causes the number of bits for storage of the frame to exceed an allocated number of bits per frame.

At block 206, it is determined if the percentage of pixels changed in a frame is smaller than the derived threshold. As previously described, the encoded bitrate and associated bitrate budget are used to derive the threshold. This threshold may be dynamic in that it changes from frame to frame, based on the content to be encoded. The percentage of pixels changed for a particular frame is compared to the derived threshold. The derived threshold ensures that the target bit rate for the frame is not exceeded. In embodiments, the threshold determined at block 204 can be used to determine a bitrate within the bitrate budget. If the bitrate is less than a target bitrate, then the frame is encoded via the selective encoding modes.

For instance, a frame N−1 may be encoded at 1 Mb according to the current target bitrate. That is, the encoding bit rate and the frame rate result in 1 Mb being allocated to the storage and transmission of frame N−1 while remaining below a maximum target bitrate. In this example, the frame N−1 quality may be at a point of being considered visually lossless based on the current 1 Mb target. Consider the next frame N that appears, which may have 20% of the pixels change when compared to the previous frame N−1. Using a typical encoding configuration, only 200 kb would be needed to maintain the same quality, as 20% of the 1 Mb target results in 200 kb allocated for the changed pixels. However, to reduce power and bandwidth, the selective encoding can be enabled which may increase a transmission bandwidth needed to above 200 kb. Based on content type, type of change, complexity heuristics from pre-processing such as HME, etc., an estimate of the needed bandwidth is derived and used as a threshold to ensure the increase in bandwidth due to selective encoding is less than the 1 Mb. When the use of the selective coding is below the target threshold of 1 Mb per frame, selective coding can be applied to the changed pixels. For example, selective coding may result in the use of 800 kb to encode the changed pixels. In this scenario, while the transmission bandwidth is higher than using normal encoding, there is enough headroom to transmit the encoded frame while maintaining quality and significantly reducing system bandwidth and power. In embodiments, the bits used to enable selective coding, depend on, at least in part, the types of encoding features that are disabled during selective coding.

Referring again to block 206, if the percentage of pixels changed in a frame is not smaller than the derived threshold, process flow continues to block 208. At block 208, the entire frame is encoded. In particular, the frame may be encoded according to any encoding technique. For example, the current frame N is written to a new frame buffer. The reconstructive picture is read, then a new reconstructive picture is written that will become a reference. This results in the consumption of two frames worth of bandwidth for each time an entire frame is encoded. In this case, the current frame N is always available as a future reference and once it is encoded, it remains referenceable. It remains the exact same frame until it is removed from the reference picture list, which varies depending the particular encoding scheme. Process flow then continues to block 210, where a wait for the next frame occurs. When the next frame is ready for encode, process flow returns to block 202.

At block 206, if the percentage of pixels changed in a frame is smaller than the derived threshold, process flow continues to block 212. At block 212, the previous frame (N−1) that is referenced by the current frame N is marked as non-referenceable for future frames (N+1) and beyond. In embodiments, frame N−1 is marked non-referenceable via a communication between a media driver and an internal development interface.

Beginning with block 212, frame N is encoded and will use frame N−1 as a reference. After frame N is encoded, future frames will not use frame N−1 as a reference as it is marked as non-referenceable. However, future frames such as frame N+1 will need a previous reference. Thus, while encoding frame N, the changed blocks in frame N will overwrite the portion of the reconstructed reference frame N−1 with the corresponding reconstructed output (so the reconstructed intra or ZMV blocks). As a result, frame N−1 will no longer exist as it originally was encoded as it now has become the reconstructed reference frame of frame N. The static parts that are used in place of the previous frame N−1 are still obtained from frame N−1, however the pixels that have changed are now from frame N and are overwritten onto frame N−1. Thus, the coding process does not read or write an entire reconstructed frame. Instead, the small portion that changes between two frames is used for reconstruction.

At block 214, the motion vector search and cross block features such as in-loop deblocking (ILDB) and out-loop deblocking (OLDB) are disabled. Block 214 also eliminates any motion vector search, cross block filtering, or other encoding processes that will cross block boundaries. Here, the reconstructed surface includes some blocks from frame N and other blocks frame N−1. Moreover, encoding is performed with limited modes such that the reference frame will be an accurate reference frame using the small delta values used to overwrite the reference frame N−1 that was marked non-referenceable. In embodiments, by disabling encoding processes that cross block boundaries, the amount of processing done during encoding can be reduced, thereby enabling a low power mode.

At block 216, static blocks are encoded as skip mode and an encode decision is made for any changed blocks. The encode decision may between zero-motion vector and intra coding. In particular, static portions of the current frame (N) are grouped into multiple static slices and the remaining portions of the frame are grouped into multiple non-static slices. The static slices will completely by-pass the encoding processing including a motion search, mode decision, pixel reconstruction, sample adaptive offset (SAO), loop filtering, and the like. Bit stream packing will be applied to the static slices and treated as skip blocks. The non-static slices are coded as either intra mode or zero motion vector coding with regular reconstruction. The pixels in the non-static slices are reconstructed and written out into the memory. In embodiments, it is also required that SAO and other in-loop and out-of-loop deblocking features to be disabled at the LCU boundaries which are the transition from static to non-static or from non-static to static. After frame N is selectively encoded, process flow continues to block 210.

Thus, in embodiments the motion vector search, cross block filtering, and other processes that will go across coding boundaries are not performed. Additionally, encoding is performed with limited modes such that that the reference frame will be an accurate reference frame. However, the only written portion of the reconstructive frame is the small delta. The present techniques use the bitrate budget and determine if within the bitrate budget if there are enough bits allocated for each frame within the bitrate to switch into the selective mode. Accordingly, deriving the threshold involves a compromise between the frame quality and how many bits are needed to be in the selective mode to get obtain a quality output.

The selective coding technique described herein improves system bandwidth, power and performance. The static blocks coded as skip are processed relatively quickly, for example, within ten clock cycles, when compared to a normal block processing time such as two hundred clock cycles for 16×16 block size. This faster processing also results in lower power consumption due to shortening the duty cycle from a full frame to a fraction of the frame. Also, the bandwidth is reduced due to the only blocks being read are the source (and potentially reference for ZMV) of the changed blocks. Further, the only writes are only the changed blocks. As a result, the bandwidth goes from 2× the frame size to 0.1× the frame size if, for example, 5% of the frame has changed. In some cases, because the block decisions are limited to either ZMV or intra-coding, the compression of those blocks may be worse than typical coding. In this scenario, only a small part of the frame is changed resulting in ample bandwidth to transmit the blocks at worse compression. The bitrate is taken into account to make sure there is enough bandwidth for the partial writing mode.

Figure 3:
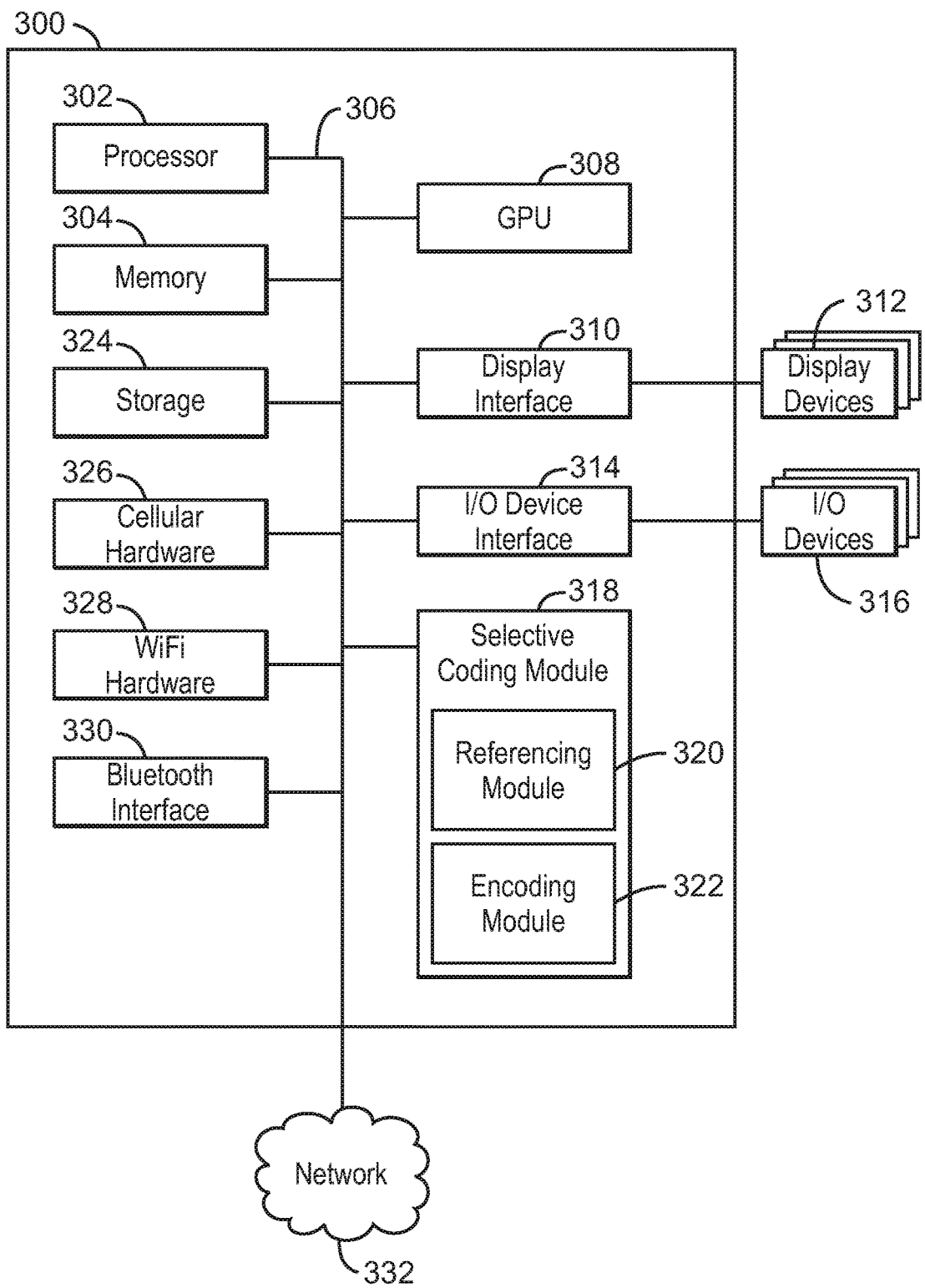
FIG. 3 is a block diagram of an exemplary system that enables selective coding for video content.

FIG. 3 is a block diagram of an exemplary system that enables selective coding for video content. The electronic device 300 may be, for example, a laptop computer, tablet computer, mobile phone, smart phone, or a wearable device, among others. The electronic device 300 may be used to receive and render media such as images and videos. The electronic device 300 may include a central processing unit (CPU) 302 that is configured to execute stored instructions, as well as a memory device 304 that stores instructions that are executable by the CPU 302. The CPU may be coupled to the memory device 304 by a bus 306. Additionally, the CPU 302 can be a single core processor, a multi-core processor, a computing cluster, or any number of other configurations. Furthermore, the electronic device 300 may include more than one CPU 302. The memory device 304 can include random access memory (RAM), read only memory (ROM), flash memory, or any other suitable memory systems. For example, the memory device 304 may include dynamic random access memory (DRAM).

The electronic device 300 also includes a graphics processing unit (GPU) 308. As shown, the CPU 302 can be coupled through the bus 306 to the GPU 308. The GPU 308 can be configured to perform any number of graphics operations within the electronic device 300. For example, the GPU 308 can be configured to render or manipulate graphics images, graphics frames, videos, streaming data, or the like, to be rendered or displayed to a user of the electronic device 300. In some embodiments, the GPU 308 includes a number of graphics engines, wherein each graphics engine is configured to perform specific graphics tasks, or to execute specific types of workloads.

The CPU 302 can be linked through the bus 306 to a display interface 310 configured to connect the electronic device 300 to one or more display devices 312. The display devices 312 can include a display screen that is a built-in component of the electronic device 300. In embodiments, the display interface 310 is coupled with the display devices 312 via any networking technology such as cellular hardware 326, Wi-Fi hardware 328, or Bluetooth Interface 330 across the network 332. The display devices 312 can also include a computer monitor, television, or projector, among others, that is externally connected to the electronic device 300.

The CPU 302 can also be connected through the bus 306 to an input/output (I/O) device interface 314 configured to connect the electronic device 300 to one or more I/O devices 316. The I/O devices 316 can include, for example, a keyboard and a pointing device, wherein the pointing device can include a touchpad or a touchscreen, among others. The I/O devices 316 can be built-in components of the electronic device 300, or can be devices that are externally connected to the electronic device 300. Accordingly, in embodiments, the I/O device interface 314 is coupled with the I/O devices 316 via any networking technology such as cellular hardware 326, Wi-Fi hardware 328, or Bluetooth Interface 330 across the network 332. The I/O devices 316 can also include any I/O device that is externally connected to the electronic device 300.

A selective coding module 318 may be used to apply selective coding to content to be rendered. In examples, the content may be rendered on a remote display via a wired or wireless connection. The content may also be rendered on a local display. The selective coding module may maintain traditional referencing, and marks some previous frames as invalid for future referencing. In embodiments, frame N reads only the portions that have changed from frame N−1. The selective coding module will encode and overwrite only those changed sections to the reference frame. As a result, encoding performance is much faster since the processing of blocks is similar to the percent of blocks that change, resulting in a reduction of blocks to be processed. The selective coding module includes a referencing module 320 and an encoding module 322. The referencing module may be configured to mark a reference frame N−1 as non-referenceable in response to the percentage of change being smaller than the threshold. The encoding module may be configured to encode a static portion of frame N as a skip, encode a non-static portion of frame N by referencing the reference frame N−1, and overwrite a surface of the reference frame N with portions of the reference frame N−1 that have changed as compared to frame N.

The electronic device 300 may also include a storage device 324. The storage device 324 is a physical memory such as a hard drive, an optical drive, a flash drive, an array of drives, or any combinations thereof. The storage device 324 can store user data, such as audio files, video files, audio/video files, and picture files, among others. The storage device 324 can also store programming code such as device drivers, software applications, operating systems, and the like. The programming code stored to the storage device 324 may be executed by the CPU 302, GPU 308, or any other processors that may be included in the electronic device 300.

The CPU 302 may be linked through the bus 306 to cellular hardware 326. The cellular hardware 326 may be any cellular technology, for example, the 4G standard (International Mobile Telecommunications-Advanced (IMT-Advanced) Standard promulgated by the International Telecommunications Union-Radio communication Sector (ITU-R)). In this manner, the electronic device 300 may access any network 332 without being tethered or paired to another device, where the cellular hardware 326 enables access to the network 332.

The CPU 302 may also be linked through the bus 306 to Wi-Fi hardware 328. The Wi-Fi hardware 328 is hardware according to Wi-Fi standards (standards promulgated as Institute of Electrical and Electronics Engineers' (IEEE) 802.11 standards). The Wi-Fi hardware 328 enables the electronic device 300 to connect to the Internet using the Transmission Control Protocol and the Internet Protocol (TCP/IP). Accordingly, the electronic device 300 can enable end-to-end connectivity with the Internet by addressing, routing, transmitting, and receiving data according to the TCP/IP protocol without the use of another device. Additionally, a Bluetooth Interface 330 may be coupled to the CPU 302 through the bus 306. The Bluetooth Interface 330 is an interface according to Bluetooth networks (based on the Bluetooth standard promulgated by the Bluetooth Special Interest Group). The Bluetooth Interface 330 enables the electronic device 300 to be paired with other Bluetooth enabled devices through a personal area network (PAN). Accordingly, the network 332 may be a PAN. Examples of Bluetooth enabled devices include a laptop computer, desktop computer, ultrabook, tablet computer, mobile device, or server, among others.

The block diagram of FIG. 3 is not intended to indicate that the electronic device 300 is to include all of the components shown in FIG. 3. Rather, the computing system 300 can include fewer or additional components not illustrated in FIG. 3 (e.g., sensors, power management integrated circuits, additional network interfaces, etc.). The electronic device 300 may include any number of additional components not shown in FIG. 3, depending on the details of the specific implementation. Furthermore, any of the functionalities of the CPU 302 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 4:
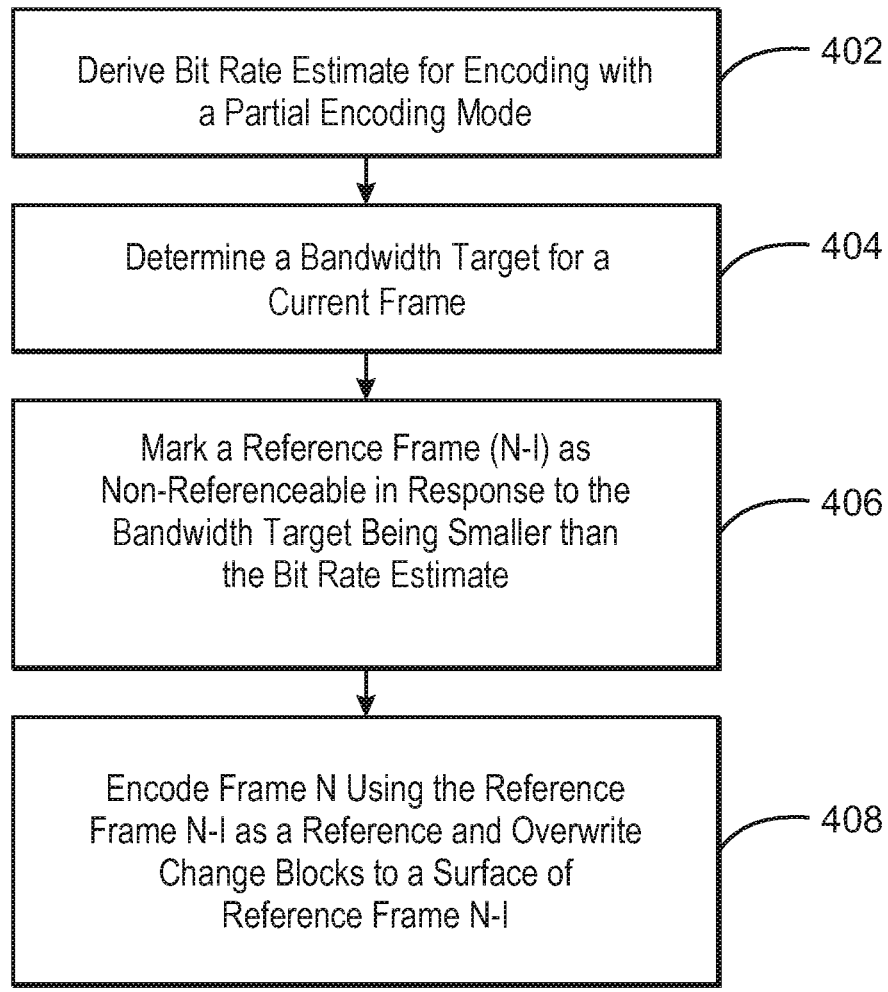
FIG. 4 is a block diagram of a method for selective coding.

FIG. 4 is a block diagram of a method 400 for selective coding. At block 402, a bitrate estimate for encoding in a partial, selective mode is derived. The bitrate estimate is derived based on a plurality of factors to obtain an estimated bitrate for selective encoding while maintaining an acceptable quality level with regards to the target bitrate, and may be expressed as a maximum threshold level. The factors may be, for example, factors such as the frame resolution, quality of the prior reconstructed reference frame, current target bitrate/frame bitrate budget, content type, type of change (letter typed, mouse moved, etc.), heuristics from pre-processing such as hierarchical motion estimation (HME), and the like. The quality level may be defined by the quantization parameter (QP) or visual quality metrics such as peak-to-peak signal to noise ratio (PSNR), structural similarity (SSIM), visual quality metric (VQM), etc. In embodiments, an acceptable quality level may refer to a lack of artifacts, block edges, ringing artifacts, of any other visually perceptible defects in the encoded video stream after it is rendered. In embodiments, a bandwidth target for the current frame is determined. A number of bits allocated for each frame may be calculated by dividing a target bitrate of the encoded video stream by the frame rate of the video stream. The result is a number of bits allocated for each frame that is within the target bitrate of the encoded video stream. A percentage of pixels that can change without degrading the picture quality may be determined as a percentage of the pixels allocated for each frame.

At block 404, a percentage of pixels changed for the current frame is determined. The percentage of pixels changed may be the number of pixels that have changed when compared to the previous frame. Changed pixels, as used herein, are those pixels that have different pixel values when compared to a previous frame. At block 406, in response to a percentage of changed pixels being smaller than the threshold bitrate estimate, a reference frame (N−1) is marked as non-referenceable for future frames. As an example, consider a system using a system memory bandwidth of approximately 2 Megabits (Mb) per frame to reconstruct entire reference frames when all pixels in the frame changed. If ten percent of the pixels of a current frame have changed, a quick estimate for encoding the current frame with the normal encoder tools results in a bitrate estimate of 0.2 Mb, as the ten percent of the changed pixels are allocated ten percent of the 2 Mb bandwidth. During selective coding, some of the tools used for compression may be disabled to minimize system bandwidth. When certain components of typical coding schemes are disabled, the amount or number of bits used to encode the data may increase. For example, the bandwidth estimate for the frame to maintain a visual quality level may increase from 0.2 Mb to 1.2 Mb when encoding the changed pixels of the frame, which is still below the target bitrate of 2 Mb. The increase in bandwidth is dependent on the encoding modules that are disabled. In this example, the selective encoding mode can be enabled to reduce power by disabling various components of a typical encoding scheme. Additionally, the system bandwidth is also reduced as a result of encoding the changed pixels. Moreover, the system may enter a low power mode, due to a shortening of a duty cycle from a full frame to a fraction of the frame. However, if the selective encoding mode results in an increase in bandwidth of greater than 2 Mb, selective coding may not be used as the target bandwidth for the frame has been exceeded.

At block 408, frame N is encoded using the reference frame N−1 as a reference while overwriting change blocks to the frame N−1 surface. In embodiments, a static portion of frame N is encoded as a skip and a non-static portion of frame N is encoded by using intra or ZMV with frame N−1 as reference.

Figure 5:
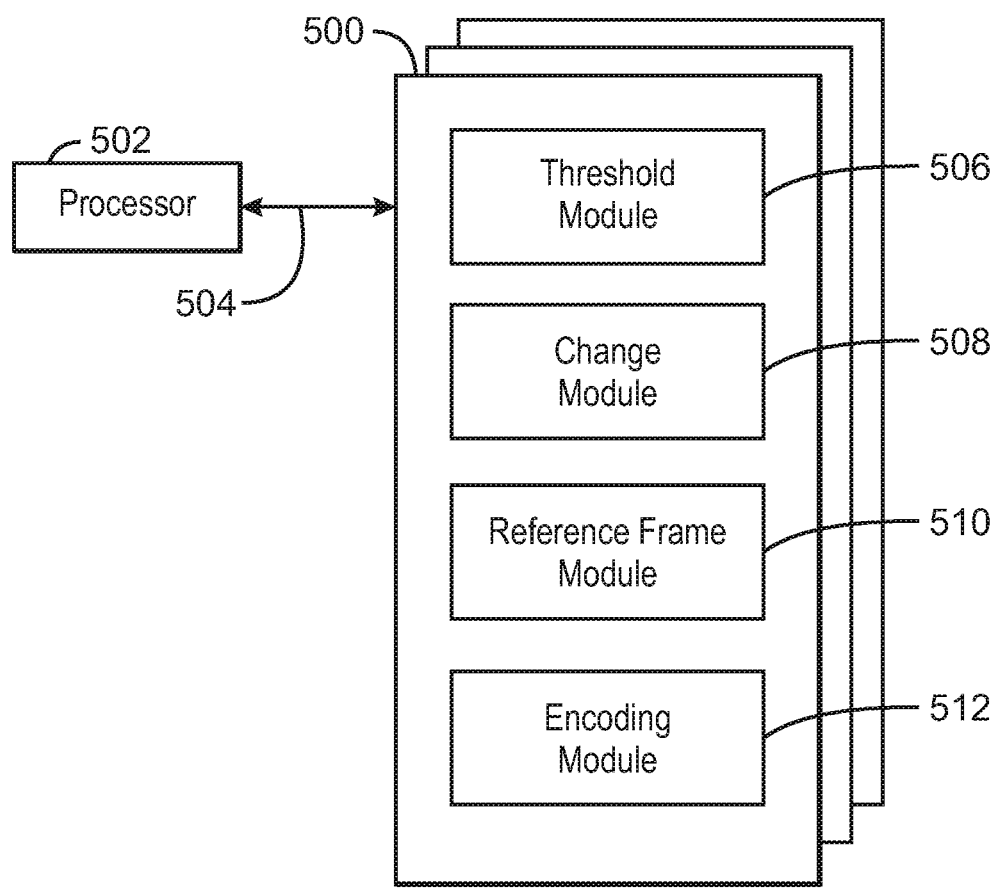
FIG. 5 is a block diagram showing a medium that contains logic for selective coding.

FIG. 5 is a block diagram showing a medium 500 that contains logic for selective coding. The medium 500 may be a computer-readable medium, including a non-transitory medium that stores code that can be accessed by a processor 502 over a computer bus 504. For example, the computer-readable medium 500 can be volatile or non-volatile data storage device. The medium 500 can also be a logic unit, such as an Application Specific Integrated Circuit (ASIC), a Field Programmable Gate Array (FPGA), or an arrangement of logic gates implemented in one or more integrated circuits, for example.

The various software components discussed herein may be stored on the tangible, non-transitory computer-readable medium 500, as indicated in FIG. 5. The medium 500 may include modules 506-512 configured to perform the techniques described herein. For example, a threshold module 506 may be configured to derive a threshold. In embodiments, the threshold is the maximum number of bits that can be encoded using selective coding. A change module 508 may be configured to determine an amount of changed pixels in the current frame as compared to the previous frame. A reference frame module 510 may be configured to mark the reference frame as non-referenceable in response to the amount or number of pixels changed being less than the threshold. An encoding module 512 may be configured to encode frame N using reference frame N−1 as a reference while overwriting change blocks to the frame N−1 surface in response to the amount or number of pixels changed being less than the threshold.

The block diagram of FIG. 5 is not intended to indicate that the tangible, non-transitory computer-readable medium 500 is to include all of the components shown in FIG. 5. Further, the tangible, non-transitory computer-readable medium 500 may include any number of additional components not shown in FIG. 5, depending on the details of the specific implementation.

Example 1 is a method. The method includes deriving a threshold to maintain an encoding bitrate; determining a percentage of change of a current frame N; marking a reference frame N−1 as non-referenceable in response to the percentage of change of the current fame N being smaller than the threshold; encoding a static portion of frame N as a skip and a non-static portion of frame N by referencing the reference frame N−1; and overwriting a surface of the reference frame N−1 with portions of the current frame N that have changed as compared to the reference frame N−1.

Example 2 includes the method of example 1, including or excluding optional features. In this example, threshold is based on the frame resolution, quality of the prior reconstructed reference frame, current target bitrate/frame bitrate budget, content type, type of change, or any combination thereof.

Example 3 includes the method of any one of examples 1 to 2, including or excluding optional features. In this example, the threshold is based on a plurality of factors that impact the encoding bitrate.

Example 4 includes the method of any one of examples 1 to 3, including or excluding optional features. In this example, the non-static portion of the current frame N is encoded using a zero motion vector or intra-mode coding.

Example 5 includes the method of any one of examples 1 to 4, including or excluding optional features. In this example, the method includes encoding an entirety of the current frame N by referencing frame N−1 in response to the percentage of change not being smaller than the threshold.

Example 6 includes the method of any one of examples 1 to 5, including or excluding optional features. In this example, the method includes marking frame N−1 as referenceable in response to the percentage of change not being smaller than the threshold.

Example 7 includes the method of any one of examples 1 to 6, including or excluding optional features. In this example, the encoding bitrate is based on a bitrate budget.

Example 8 includes the method of any one of examples 1 to 7, including or excluding optional features. In this example, a motion vector search and cross block features are disabled for encoding in response to the percentage of change being smaller than the threshold.

Example 9 includes the method of any one of examples 1 to 8, including or excluding optional features. In this example, overwriting change blocks to a surface comprising the reference frame N−1 replaces the entire reference frame N−1 with a delta between frame N and frame N−1.

Example 10 includes the method of any one of examples 1 to 9, including or excluding optional features. In this example, the method includes iteratively deriving, determining, marking, encoding, and overwriting changed portions.

Example 11 is an apparatus. The apparatus includes a processing unit configured to derive a threshold to maintain an encoding bitrate and determine a percentage of change of a current frame N when compared to a reference frame N−1; a referencing module to mark the reference frame N−1 as non-referenceable in response to the percentage of change being smaller than the threshold; and an encoding module to encode a static portion of the current frame N as a skip and encoding a non-static portion of the current frame N by referencing the reference frame N−1 and overwrite a surface of the reference frame N−1 with portions of the current frame N that have changed as compared to the reference frame N−1.

Example 12 includes the apparatus of example 11, including or excluding optional features. In this example, in response to the percentage of change being smaller than the threshold, encoding processes that cross block boundaries of the current frame N are eliminated.

Example 13 includes the apparatus of any one of examples 11 to 12, including or excluding optional features. In this example, in response to the percentage of change being smaller than the threshold, encoding processes are limited to enable a low power mode.

Example 14 includes the apparatus of any one of examples 11 to 13, including or excluding optional features. In this example, the non-static portion of frame N is encoded as a zero motion vector or intra-mode coding.

Example 15 includes the apparatus of any one of examples 11 to 14, including or excluding optional features. In this example, the apparatus includes encoding an entirety of the current frame N by referencing frame N−1 in response to the percentage of change not being smaller than the threshold.

Example 16 includes the apparatus of any one of examples 11 to 15, including or excluding optional features. In this example, the apparatus includes marking frame N−1 as referenceable in response to the percentage of change not being smaller than the threshold.

Example 17 includes the apparatus of any one of examples 11 to 16, including or excluding optional features. In this example, the threshold is based on the frame resolution, quality of the prior reconstructed reference frame, current target bitrate/frame bitrate budget, content type, type of change, or any combination thereof.

Example 18 includes the apparatus of any one of examples 11 to 17, including or excluding optional features. In this example, a motion vector search and cross block features are disabled for encoding in response to the percentage of change being smaller than the threshold.

Example 19 includes the apparatus of any one of examples 11 to 18, including or excluding optional features. In this example, overwriting change blocks to a surface comprising the reference frame N−1 replaces an entirety of the reference frame N−1 with a delta between the current frame N and the reference frame N−1.

Example 20 includes the apparatus of any one of examples 11 to 19, including or excluding optional features. In this example, the current frame N is limited to referencing the portions of the reference frame N−1 that have changed when compared to the current frame N.

Example 21 is at least one non-transitory machine readable medium having instructions stored therein that. The computer-readable medium includes instructions that direct the processor to derive a threshold to maintain an encoding bitrate; determine a percentage of change of a current frame N; mark a reference frame N−1 as non-referenceable in response to the percentage of change being smaller than the threshold; encode a static portion of the current frame N as a skip and encoding a non-static portion of the current frame N by referencing the reference frame N−1; and overwrite a surface of the reference frame N−1 with portions of the current frame N−1 that have changed as compared to the reference frame N−1.

Example 22 includes the computer-readable medium of example 21, including or excluding optional features. In this example, threshold is based on the frame resolution, quality of the prior reconstructed reference frame, current target bitrate/frame bitrate budget, content type, type of change, or any combination thereof.

Example 23 includes the computer-readable medium of any one of examples 21 to 22, including or excluding optional features. In this example, the threshold is based on a plurality of factors that impact the encoding bitrate.

Example 24 includes the computer-readable medium of any one of examples 21 to 23, including or excluding optional features. In this example, the non-static portion of the current frame N is encoded using a zero motion vector or intra-mode coding.

Example 25 includes the computer-readable medium of any one of examples 21 to 24, including or excluding optional features. In this example, the computer-readable medium includes encoding an entirety of the current frame N by referencing frame N−1 in response to the percentage of change not being smaller than the threshold.

Example 26 includes the computer-readable medium of any one of examples 21 to 25, including or excluding optional features. In this example, the computer-readable medium includes marking frame N−1 as referenceable in response to the percentage of change not being smaller than the threshold.

Example 27 includes the computer-readable medium of any one of examples 21 to 26, including or excluding optional features. In this example, the encoding bitrate is based on a bitrate budget.

Example 28 includes the computer-readable medium of any one of examples 21 to 27, including or excluding optional features. In this example, a motion vector search and cross block features are disabled for encoding in response to the percentage of change being smaller than the threshold.

Example 29 includes the computer-readable medium of any one of examples 21 to 28, including or excluding optional features. In this example, overwriting change blocks to a surface comprising the reference frame N−1 replaces the entire reference frame N−1 with a delta between frame N and frame N−1.

Example 30 includes the computer-readable medium of any one of examples 21 to 29, including or excluding optional features. In this example, the computer-readable medium includes iteratively deriving, determining, marking, encoding, and overwriting changed portions.

Example 31 is a system. The system includes instructions that direct the processor to an encoder comprising hardware units, wherein when the encoder is to execute the plurality of hardware units the hardware units are operable to: derive a threshold to maintain an encoding bitrate; determine a percentage of change of a current frame N; mark a reference frame N−1 as non-referenceable in response to the percentage of change being smaller than the threshold; encode a static portion of the current frame N as a skip and encoding a non-static portion of the current frame N by referencing the reference frame N−1; and overwrite a surface of the reference frame N−1 with portions of the current frame N−1 that have changed as compared to the reference frame N−1.

Example 32 includes the system of example 31, including or excluding optional features. In this example, threshold is based on the frame resolution, quality of the prior reconstructed reference frame, current target bitrate/frame bitrate budget, content type, type of change, or any combination thereof.

Example 33 includes the system of any one of examples 31 to 32, including or excluding optional features. In this example, the threshold is based on a plurality of factors that impact the encoding bitrate.

Example 34 includes the system of any one of examples 31 to 33, including or excluding optional features. In this example, the non-static portion of the current frame N is encoded using a zero motion vector or intra-mode coding.

Example 35 includes the system of any one of examples 31 to 34, including or excluding optional features. In this example, the system includes encoding an entirety of the current frame N by referencing frame N−1 in response to the percentage of change not being smaller than the threshold.

Example 36 includes the system of any one of examples 31 to 35, including or excluding optional features. In this example, the system includes marking frame N−1 as referenceable in response to the percentage of change not being smaller than the threshold.

Example 37 includes the system of any one of examples 31 to 36, including or excluding optional features. In this example, the encoding bitrate is based on a bitrate budget.

Example 38 includes the system of any one of examples 31 to 37, including or excluding optional features. In this example, a motion vector search and cross block features are disabled for encoding in response to the percentage of change being smaller than the threshold.

Example 39 includes the system of any one of examples 31 to 38, including or excluding optional features. In this example, overwriting change blocks to a surface comprising the reference frame N−1 replaces the entire reference frame N−1 with a delta between frame N and frame N−1.

Example 40 includes the system of any one of examples 31 to 39, including or excluding optional features. In this example, the system includes iteratively deriving, determining, marking, encoding, and overwriting changed portions.

Example 41 is an apparatus. The apparatus includes instructions that direct the processor to a processing unit configured to derive a threshold to maintain an encoding bitrate and determine a percentage of change of a current frame N when compared to a reference frame N−1; a referencing module to mark the reference frame N−1 as non-referenceable in response to the percentage of change being smaller than the threshold; and a means to encode a static portion of the current frame N as a skip and encoding a non-static portion of the current frame N by referencing the reference frame N−1 and overwrite a surface of the reference frame N−1 with portions of the current frame N that have changed as compared to the reference frame N−1.

Example 42 includes the apparatus of example 41, including or excluding optional features. In this example, in response to the percentage of change being smaller than the threshold, encoding processes that cross block boundaries of the current frame N are eliminated.

Example 43 includes the apparatus of any one of examples 41 to 42, including or excluding optional features. In this example, in response to the percentage of change being smaller than the threshold, encoding processes are limited to enable a low power mode.

Example 44 includes the apparatus of any one of examples 41 to 43, including or excluding optional features. In this example, the non-static portion of frame N is encoded as a zero motion vector or intra-mode coding.

Example 45 includes the apparatus of any one of examples 41 to 44, including or excluding optional features. In this example, the apparatus includes encoding an entirety of the current frame N by referencing frame N−1 in response to the percentage of change not being smaller than the threshold.

Example 46 includes the apparatus of any one of examples 41 to 45, including or excluding optional features. In this example, the apparatus includes marking frame N−1 as referenceable in response to the percentage of change not being smaller than the threshold.

Example 47 includes the apparatus of any one of examples 41 to 46, including or excluding optional features. In this example, the threshold is based on the frame resolution, quality of the prior reconstructed reference frame, current target bitrate/frame bitrate budget, content type, type of change, or any combination thereof.

Example 48 includes the apparatus of any one of examples 41 to 47, including or excluding optional features. In this example, a motion vector search and cross block features are disabled for encoding in response to the percentage of change being smaller than the threshold.

Example 49 includes the apparatus of any one of examples 41 to 48, including or excluding optional features. In this example, overwriting change blocks to a surface comprising the reference frame N−1 replaces an entirety of the reference frame N−1 with a delta between the current frame N and the reference frame N−1.

Example 50 includes the apparatus of any one of examples 41 to 49, including or excluding optional features. In this example, the current frame N is limited to referencing the portions of the reference frame N−1 that have changed when compared to the current frame N.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method, comprising:
   deriving a threshold to maintain an encoding bitrate of a reference frame for a current frame, the threshold corresponding to a percentage of pixels changed, in a current frame compared to pixels of the reference frame, that permits selective coding;
   determining a percentage of pixels changed in the current frame compared to the pixels in the reference frame;
   marking a reference frame as non-referenceable in response to the percentage of pixels changed in the current frame being smaller than the threshold;
   encoding a static portion of the current frame as a skip;
   encoding a non-static portion of the current frame by referencing the reference frame; and
   overwriting the pixels of the reference frame with pixels of the current frame that have changed as compared to the reference frame.

2. The method of claim 1, wherein the threshold is based on a frame resolution, quality of the reference frame, current target bitrate/frame bitrate budget, content type, type of change, or any combination thereof.

3. The method of claim 1, wherein the threshold is based on a plurality of factors that impact the encoding bitrate.

4. The method of claim 1, wherein the non-static portion of the current frame is encoded using a zero motion vector or intra-mode coding.

5. The method of claim 1, further including encoding an entirety of the current frame by referencing the reference frame in response to the percentage of pixels changed in the current frame being greater than the threshold.

6. The method of claim 1, further including marking the reference frame as referenceable in response to the percentage of pixels changed in the current frame being greater than the threshold.

7. The method of claim 1, wherein the encoding bitrate is based on a bitrate budget.

8. The method of claim 1, wherein a motion vector search and cross block features are disabled for encoding in response to the percentage of pixels changed in the current frame being smaller than the threshold.

9. The method of claim 1, wherein overwriting the pixels of the reference frame with pixels of the current frame that have changed as compared to the reference frame replaces the reference frame with a delta between the current frame and the reference frame.

10. The method of claim 1, further including iteratively deriving, determining, marking, encoding, and overwriting changed portions.

11. An apparatus, comprising:
    a processing unit configured to:
      derive a threshold to maintain an encoding bitrate of a reference frame for a current frame, wherein the threshold is derived on a per-frame basis, the threshold corresponding to a percentage of pixels changed, in a current frame compared to pixels of the reference frame, that permits selective coding;
      determine a percentage of pixels changed in the current frame when compared to pixels in the reference frame; and
      mark the reference frame as non-referenceable in response to the percentage of pixels changed in the current frame being smaller than the threshold; and
    an encoding module to:
      encode a static portion of the current frame as a skip;
      encode a non-static portion of the current frame by referencing the reference frame; and
      overwrite the pixels of the reference frame with pixels of the current frame that have changed as compared to the reference frame.

12. The apparatus of claim 11, wherein in response to the percentage of pixels changed in the current frame being smaller than the threshold, encoding processes that cross block boundaries of the current frame are eliminated.

13. The apparatus of claim 11, wherein in response to the percentage of pixels changed in the current frame being smaller than the threshold, encoding processes are limited to enable a low power mode.

14. The apparatus of claim 11, wherein the non-static portion of the current frame is encoded as a zero motion vector or intra-mode coding.

15. The apparatus of claim 11, further including encoding an entirety of the current frame by referencing the reference frame in response to the percentage of pixels changed in the current frame being greater than the threshold.

16. The apparatus of claim 11, further including marking the reference frame as referenceable in response to the percentage of pixels changed in the current frame being greater than the threshold.

17. The apparatus of claim 11, wherein the threshold is based on a frame resolution, quality of the reference frame, current target bitrate/frame bitrate budget, content type, type of change, or any combination thereof.

18. The apparatus of claim 11, wherein a motion vector search and cross block features are disabled for encoding in response to the percentage of pixels changed in the current frame being smaller than the threshold.

19. The apparatus of claim 11, wherein overwriting the pixels of the reference frame with pixels of the current frame that have changed as compared to the reference frame replaces an entirety of the reference frame with a delta between the current frame and the reference frame.

20. The apparatus of claim 11, wherein the current frame is limited to referencing the pixels of the reference frame that have changed when compared to the current frame.

21. A system, comprising:
an encoder including instructions that, when executed, cause a plurality of hardware units:
derive a threshold to maintain an encoding bitrate of a reference frame for a current frame, the threshold corresponding to a percentage of pixels changed, in a current frame compared to pixels of the reference frame, that permits selective coding;
determine a percentage of pixels changed in the current frame compared to the pixels of the reference frame;
mark a reference frame as non-referenceable in response to the percentage of pixels changed in the current frame being smaller than the threshold;
encode a static portion of the current frame as a skip;
encode a non-static portion of the current frame by referencing the reference frame; and
overwrite the pixels of the reference frame with pixels of the current frame that have changed as compared to the reference frame.

22. The system of claim 21, wherein threshold is based on a frame resolution, quality of the reference frame, current target bitrate/frame bitrate budget, content type, type of change, or any combination thereof.

23. The system of claim 21, wherein the threshold is based on a plurality of factors that impact the encoding bitrate.

24. The system of claim 21, wherein the non-static portion of the current frame is encoded using a zero motion vector or intra-mode coding.

25. The system of claim 21, further including instructions that, when executed, cause the plurality of hardware units to encode an entirety of the current frame by referencing frame in response to the percentage of pixels changed in the current frame being greater than the threshold.

\* \* \* \* \*